United States Patent [19]

Pleickhardt

[11] 4,279,341

[45] Jul. 21, 1981

[54] FASTENER STRIP

[75] Inventor: George C. Pleickhardt, Des Plaines, Ill.

[73] Assignee: Illinois Tool Works Inc., Chicago, Ill.

[21] Appl. No.: 81,738

[22] Filed: Oct. 15, 1979

[51] Int. Cl.³ ..................... B65D 73/00; B65D 83/00
[52] U.S. Cl. .................... 206/345; 206/820; 206/390; 411/437; 411/527
[58] Field of Search ............... 206/345, 346, 343, 338, 206/390, 820; 85/32 V

[56] References Cited

U.S. PATENT DOCUMENTS

| | | | |
|---|---|---|---|
| 2,242,967 | 5/1941 | Carlile | 206/820 |
| 3,353,663 | 11/1967 | Kayser et al. | 206/346 |
| 3,767,039 | 10/1973 | Schroter | 206/390 |
| 3,802,476 | 4/1974 | Hoadley | 85/32 V |
| 3,963,124 | 6/1976 | Banks | 206/390 |
| 4,210,245 | 7/1980 | Dodge | 206/820 |

Primary Examiner—William T. Dixson, Jr.
Attorney, Agent, or Firm—J. R. Halvorsen; T. W. Buckman

[57] ABSTRACT

A strip of at least two interconnected fastener means carrying double-faced adhesive foam tape for application to a workpiece. The fastener means includes connecting means between adjacent fasteners that is capable of normally maintaining the fasteners in a rigid coplanar relation but adapted to permit removal of a single fastener by manual manipulation and fracture of the connecting means. The single fastener being capable of being stripped off of the backing paper used on such tape without removal of the adjacent fastener and thereby providing a tail of backing paper which can be readily grasped to remove the backing paper from the adjacent fastener.

15 Claims, 13 Drawing Figures

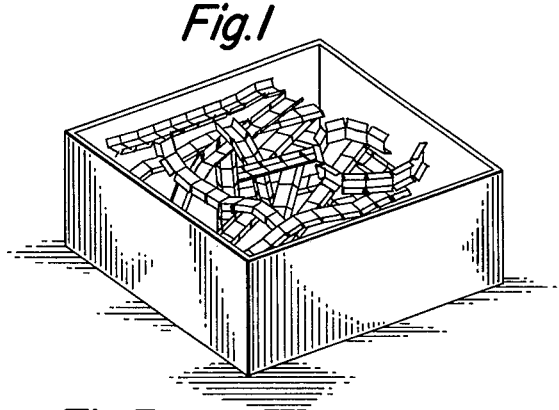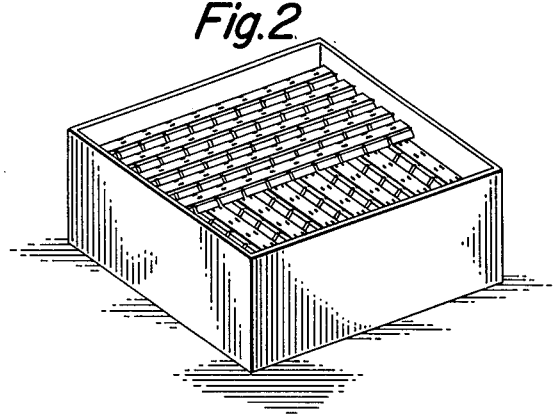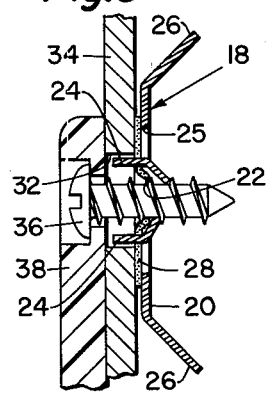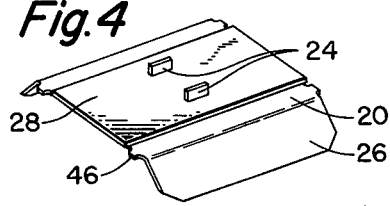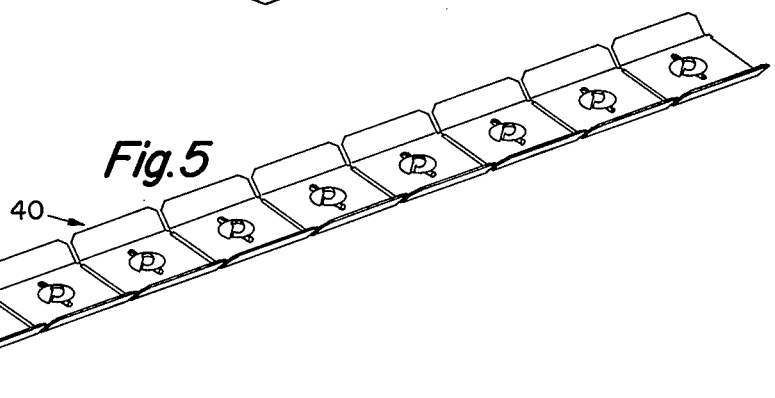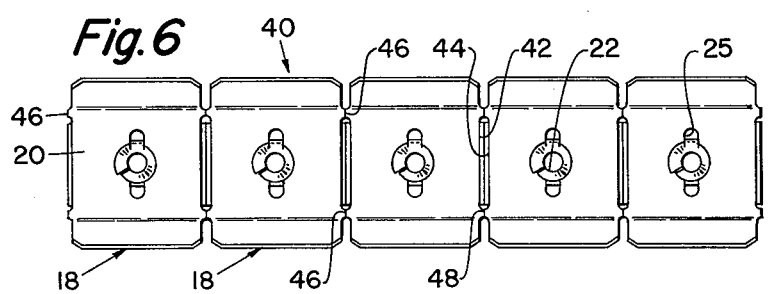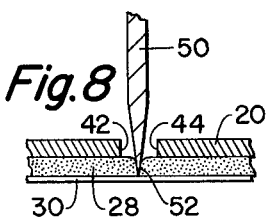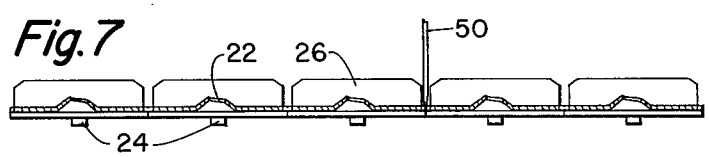

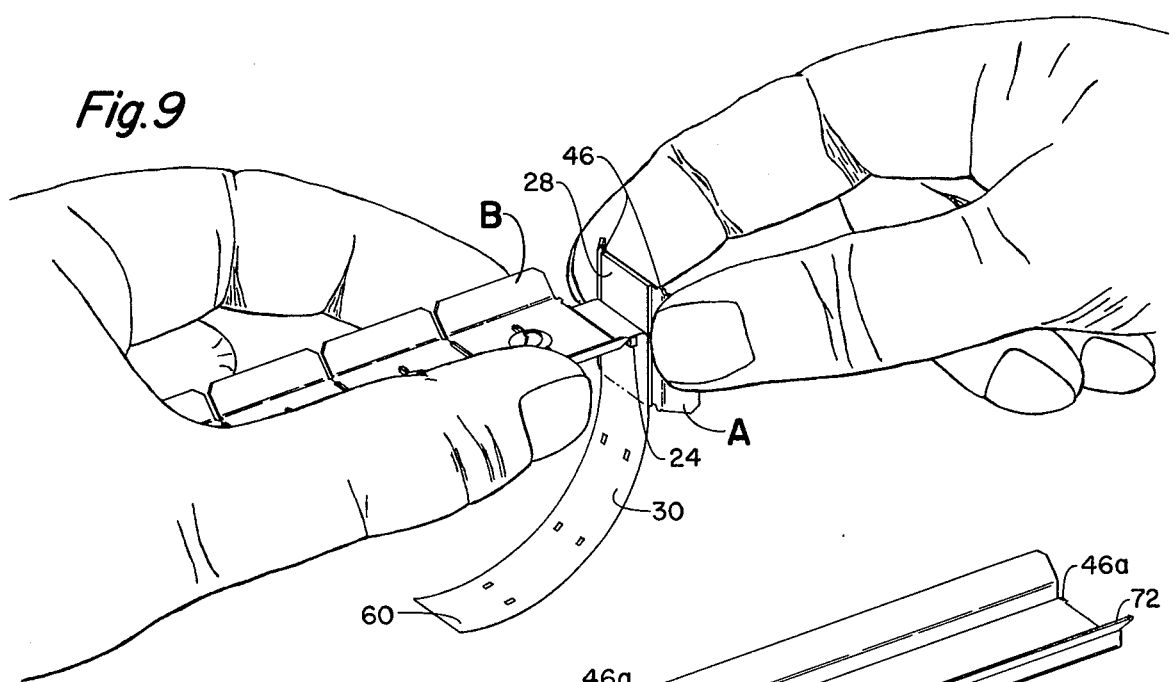
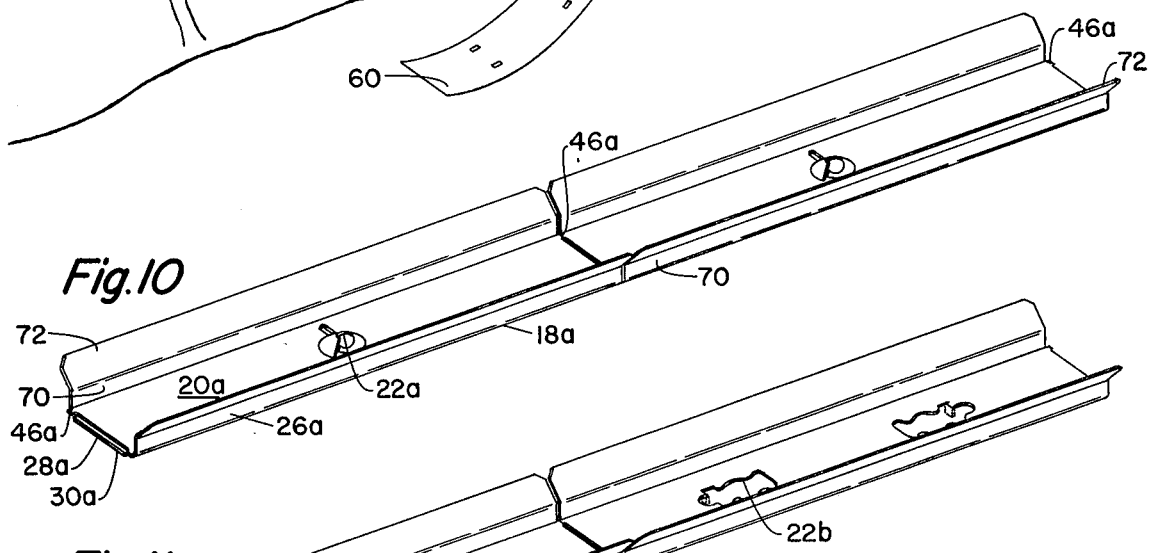
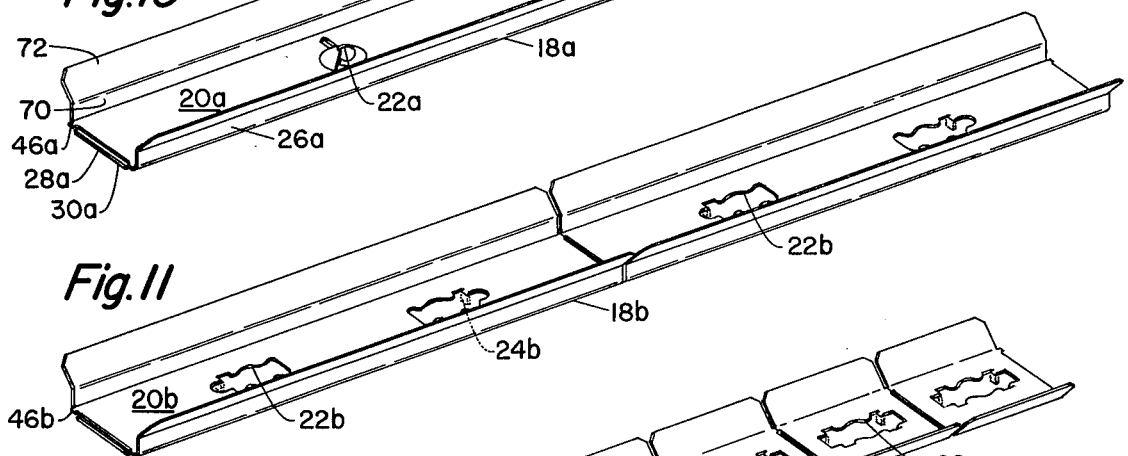
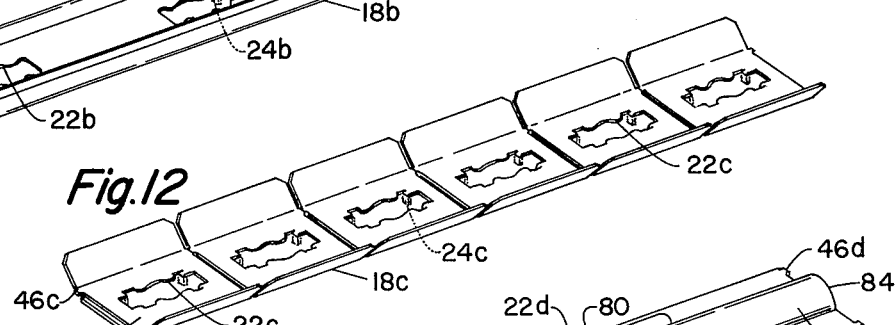
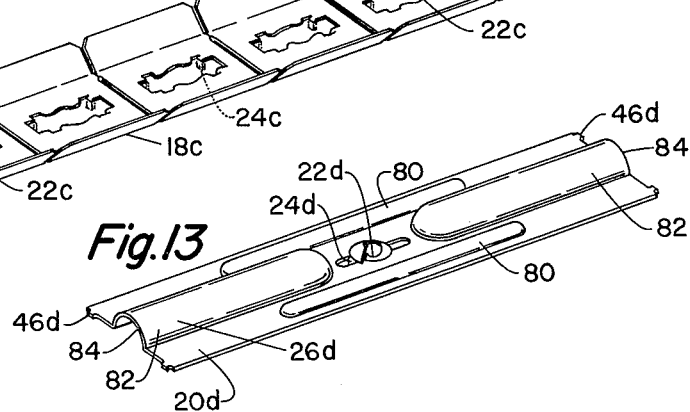

FASTENER STRIP

BACKGROUND OF THE INVENTION

This invention relates generally to a strip of fasteners of the type generally shown in U.S. Pat. No. 3,802,476 in the name of James E. Hoadley and assigned to the common assignee of the present invention. Such fasteners have heretofor been individually applied to a strip of double-faced foam type adhesive tape having a backing or strip off layer of paper or other material on one adhesive surface while the other adhesive surface of the strip of tape covers the substantially planar base portion of a plurality of fasteners with the tape but not the backing medium being scored to provide a strip of fasteners. Difficulties have occurred in the manufacture and shipment of such devices since the tape being a highly flexible material does not permit the fasteners to be bulk packaged since a heterogenous mass of such tape strips have a tendency to bend thereby exposing the tape and causing such strips to become tangeled and to adhere to one another through the medium of the pressure sensitive double-faced tape. To overcome this it has been necessary to have an operator at the station where the fastener is assembled to the tape to package such strips by manual handling into neat organized rows in alternating directions for each layer of fasteners in the packing box. This of course is an additional cost factor in the total cost of manufacture.

To collate fasteners for use in application tools is of course old in the art, for example see U.S. Pat. Nos. 3,779,373, 2,784,405, and 2,483,424 similarly the use of strips for manufacturing purposes to facilitate the handling and joining of small items can be seen in U.S. Pat. Nos. 1,793,099 and 2,108,009. A distinctive feature of the collated and stripped manufacturing techniques, however, is generally found in the fact that the individual items are separated from the adjacent item by a shearing mechanism either at the time of installation of the fastener or as a step in the manufacturing process.

Double-faced pressure sensitive foam-type tape of the type utilized in the present invention is generally manufactured in broad sheet form in a continuous operation and thence rolled up. The large rolls are then slit to the desired width with the backing medium separating the rolled layers of pressure sensitive adhesive tape. To cut off pieces of tape and then apply them to individual fasteners creates the problem of removal of the backing paper without disturbing the pressure sensitive tape. The previously described technique of providing a long strip of tape with a plurality of fasteners fixed to one surface was one solution to the problem of permitting a single fastener to be removed along with its double-faced tape from the backing medium by grasping the next adjacent fastener and rolling the first fastener off of the backing medium. As was previously pointed out, however, the flexibility of the tape did not permit bulk packaging directly from the assembly machine due to the exposure of the adhesive surfaces of the tape and their ultimate contact with adjacent fasteners. This problem had to be overcome.

SUMMARY OF THE INVENTION

The present invention relates to a strip of sheet metal fasteners consisting of two or more fasteners disposed in a planar array with adjacent fasteners being innerconnected by a fracturable means to maintain them in a substantially rigid planar configuration until manually manipulated into angular relationship relative to one another at which time the fracturable connecting means is broken. The first fastener can then be stripped off of the backing medium exposing one side of the pressure sensitive foam type adhesive tape and then located in oriented fashion on an apertured workpiece.

The present invention contemplates the use of a substantially planar base member having a fastener receiving opening therein and a pair of tabs struck from within the margins of the base portion and angularly arranged around the aperture to serve as blind locating means in the aperture of a workpiece for orientation of the fastener receiving aperture over the workpiece aperture. Grippable means are provided for grasping the fastener to serve as means for grasping the individual fastener during the stripping from the backing medium and orientation relative to the workpiece aperture.

An object of the present invention is to overcome the problems which are enumerated herein above.

Another object of the present invention is to provide an economical fastener designed in such a fashion that the formation of the sheet metal fastener and the application of the double-faced pressure sensitive foam type tape can be accomplished in a single machine on a continuous basis.

A further object of the present invention is to provide a fastening means having mounted on one face thereof a double-faced pressure sensitive tape which can be bulk packaged.

Still another object of the present invention is to provide the method for accomplishing the fabrication of such a fastener.

Other objects will be apparent to those skilled in the art when the attached drawings are viewed in reference to the detailed specification.

BRIEF DESCRIPTION OF THE DRAWINGS

FIG. 1 is a perspective view of a packing box illustrating the fashion in which devices of the prior practice would be intertwined and engaged if they were bulk packed;

FIG. 2 is an illustration of how containers of fastener strips had to be manually packed;

FIG. 3 is a side elevational view and partial section of a fastener of the type contemplated when installed in relation to a workpiece;

FIG. 4 is a perspective view of the underside of a single fastener showing the locating tabs projecting through the double-faced tape;

FIG. 5 is a perspective view of a strip of the type contemplated by the present invention;

FIG. 6 is a plan view of a portion of the strip shown in FIG. 5;

FIG. 7 is a side view and partial section of a strip of fasteners of the type contemplated by the present invention and showing a knife or shear blade for separating the foam tape but not the backing paper;

FIG. 8 is an enlarged view of the shear or knife blade shown in FIG. 7;

FIG. 9 is a view indicating the manner in which individual fasteners are removed from a strip of fasteners and thence from the backing paper covering the double-faced adhesive;

FIG. 10 is a perspective view of another embodiment of the present invention;

FIG. 11 is a perspective view of a further embodiment of the present invention;

FIG. 12 is a perspective view of still another embodiment of the present invention;

FIG. 13 is a perspective view of the final embodiment of the present invention.

DETAILED DESCRIPTION

FIG. 1 is a perspective view of a packing box into which a heterogenous mass of tape strips holding individual fasteners have been fed into a packing box in random fashion. As was previously indicated the flexibility of the tape had a tendency to expose portions of the adhesive faces, stripping of fasteners from the backing medium and thereby causing various fasteners to adhere to other fasteners making them virtually useless. To overcome this problem, as was pointed out of hereinabove, it was necessary to employ an operator at the assembly station to manually pack individual strips in parallel rows for a given layer of fasteners and to then alternate the direction of the strips of tape carrying the fasteners in the next layer. This of course incurred added expense to the total cost of the fastener strips.

As a specific of embodiment of a fastener capable of utilizing the teachings of the present invention please refer now to FIGS. 3 and 4 which generally show a fastener of the type contemplated by U.S. Pat. No. 3,802,476 assigned to the common assignee of the present invention. Such fasteners include a generally planar base portion 20 having a secondary fastener receiving opening 22 which in this embodiment is illustrated as a helical screw thread impression, a pair of locating tabs 24 that are struck from the base 20 and extend outwardly therefrom in one direction and a grippable means 26 which extend outwardly beyond the plane of base 20 in the opposite direction from the tabs 24. In the present instance the grippable means are a pair of wings 26 but can be one or more elements that extend out of the plane of base 20. A continuous double-faced pressure sensitive foam-type tape 28 is applied to the base 20 and covers a substantial portion thereof and seals the fastener receiving aperture 22 as well as the portions 25 of the base 20 from which the locating tabs 24 are struck. As shown in FIG. 4 the tabs project through the tape 28 and the backing paper 30 and after the backing paper 30 is removed the tabs 24 are utilized to locate the fastener relative to an aperture 32 in the work panel 34, by manipulation of the grippable means 26, for acceptance of a fastener 36 from the opposite side of the panel 34 to retain a secondary workpiece 38 relative to the workpiece 34.

Referring now to FIG. 5, wherein similar parts are designated by similar numerals the present invention contemplates a strip 40 consisting of two or more of the fasteners 18 illustrated in FIGS. 3 and 4. Each of the base portions 20 are provided with at least one edge that is complementary to the edge of the next adjacent fastener. In the illustrated embodiment the base portion 20 is substantially rectangular in configuration and presents an edge 42 that is linear or straight. In the stamping operation which forms a plurality of fasteners 18 into the strip 40 the edges 42 and 44 of adjacent fasteners are stamped in spaced parallel relationship separated by fracturable means of 46 that are spaced apart a predetermined distance. The fracturable means 46 include, in the present embodiment, a pair of narrow webs that are scored along the line 48 which reduces the thickness of the material of said webs, sets up stresses in the webs and permits the webs to be broken when the adjacent fasteners 18 are manually manipulated by moving the planar elements or bases 20 of adjacent fasteners into angular relationships by hinge-like movement along the scored lines 48.

After a strip of fasteners formed from flat sheet stock move through the piercing and punching operations, as known in the art and not shown, a roll of continuous tape having a width less than the predetermined spacing of the fracturable elements 46 is brought to bear against the undersurface of base 20 with the tabs 24 penetrating the tape and its backing material. Referring now to FIGS. 7 and 8 a blade-like member 50 having a width less than the spacing between confronting edges 42 and 44 and an end to end dimension equal to the width of the tape 28 but less than the spacing between fracturable portions 46 is made to reciprocate and to extend between adjacent of fasteners 18. The knife edge 52 is caused to penetrate the tape 28 and to sever the tape between adjacent fasteners 18 but to not penetrate or cut the backing medium or paper 30. A later station in the machine then shears the desired number of sequentially fasteners 18 into a strip of two or more fasteners.

As best seen in FIG. 9 a fastener 18 designated by the letter A is angularly manipulated by manual movement of an operator's hand so that the base 20 of fastener A is angularly disposed relative to the base 20 of fastener B. This angular movement breaks the fracturable portion 46 and permits fastener A to have its double-faced adhesive 28 stripped off the backing medium or paper 30 whereby the fastener A can then be applied to the workpiece 34 with the tabs 24 serving to orient the fastener A relative to the aperture 32 in the workpiece 34.

While FIG. 9 shows a strip of approximately eight fasteners the specific number of fasteners in a strip generally will be determined by the requirements of the ultimate customer and their manufacturing techniques. The present invention is applicable to two or more fasteners in a strip and should not be limited by the embodiments illustrated. It will be appreciated that the tail 60 of the backing paper 30 can be utilized for removal of the backing paper from the last fastener in a strip.

Referring now to FIG. 10 wherein similar parts will be designated by similar numerals with the addition of the suffix "a," fastener 18a includes a base 20a having a centrally disposed fastener receiving opening in the form of a helix 22a for accepting a mating screw. The undersurface carries the tape 28a and backing paper 30a with adjacent space fasteners being innerconnected by fracturable means 46a. In this embodiment the grippable element 26a includes a first portion 70 which is disposed substantially perpendicularly to the base 20a and an outwardly angularly extending portion 72 which aids in grasping the fastener 18a. The resulting channel shaped configuration of the grippable portion 26a disposed on opposite sides of the elongated base 20a rigidifies and strengthens the base 20a so as to make the fastener 18a substantially rigid. The previous fastener as well as the present one are ideally utilized against the hidden surface of a refrigerator liner. In present refrigerator constructions a plastic liner or shell is utilized and devices of the present invention are used to support elements of the refrigerator on the exposed inner surface of said liner. The back side where these fasteners are located generally is exposed to foamed-in-place insulating material with the double-faced adhesive tape sealing the apertures in the inner liner of the refrigerator against egress of the foamed-in-place insulation into the interior of the refrigerator liner. Suitable fastening means can be introduced through the apertured workpiece or liner into engagement with fasteners of the type contemplated by the present invention. Elongated devices such as the present embodiment 18a are suitable for use with elongated strips utilized to support shelving in cantilever fashion from the back wall of the plastic refrigerator liner.

While the previous embodiments shown in FIGS. 3 through 11 have utilized a helical impression for acceptance of a screw it should be recognized that other forms of fastening means can also be utilized with these sheet metal fasteners. Referring now to FIGS. 11 and 12, wherein similar numerals are used to designate similar parts with the addition of the suffices "b" and "c," the structures of these two embodiments are substantially identical to that of the previous embodiments with the singular exception that the fastener receiving apertures 22b and 22c are generally comprised of a cylindrical center portion and an enlarged keyhole slot extending outwardly in opposite directions therefrom. This gives a generally bow-tie shaped aperture designed for acceptance of a Simmons ® fastener which includes a head, a substantially rigid axially extending stud portion and a pair of spring elements extending reversely from the free end of the stud towards the head and acceptable within the enlarged ends of the bow-tie shaped aperture. When the fastener is rotated the spring elements are deflected and bear against the back side of the aperture on the portions of base 20b and 20c adjacent to the central circular form of the aperture. Such an aperture is well known in the art as are the fasteners of this configuration. These embodiments are included for purposes of illustration that fasteners other than screws can be utilized with the present invention. They do include, however, a struck down locating tabs 24b and 24c, respectively, for locating the fastener 18b and 18c so that the fastener receiving openings 22b and 22c will be oriented relative to the workpiece aperture 32.

While the previous embodiments all have the grippable means 26 illustrated as wing-like elements disposed along edges of the base 20 it will be recognized that other forms of grippable means are possible and the location of the same for gripping purposes as well as for embedment in foamed-in-place material, if it's used in refrigerators, is not material to the concept of the present invention. For example in FIG. 13, wherein similar parts are designated by similar numerals with the addition of the suffix "d," the base 20d is generally planar in configuration and encloses a fastener receiving aperture 22d, locating tabs 24d and fracturable connecting means 46d in the same fashion as was illustrated in the prior embodiments. In this embodiment a pair of strengthening ribs 80 are disposed along opposite edges to rigidify the base 20d adjacent the aperture 22d and the grippable means 26d are provided by a pair of enlarged ribs 82 extending axially down the central portion of base 20d. The semicylindrical ribs 82 blend into the base 20d adjacent the central portion thereof and are terminated in abrupt fashion at the ends 84 to provide grippable means for manipulation by an operator. Thus the location of the grippable means 26 can take many configurations other than those illustrated and will not detract from the teachings of the present invention. Other forms will be apparent to those skilled in the art.

The present invention is generally fabricated from galvanized steel or any other suitable metal which will provide adequate strength to support and engage any axially driven fastener introduced through the foam material into engagement with the fastening opening. The narrow webs joining the adjacently spaced fasteners at spaced points is scored to permit fracture thereof within a 90° bend by angular movement of of the planar base portion relative to one another.

I claim:

1. A strip of at least two sheet metal fasteners each including a generally planar base portion having a fastener receiving opening therethrough, a pair of locating tabs struck from within the margins of said base portion and angularly spaced adjacent said opening, said tabs extending downwardly from one surface of said base portion, at least one manually grippable portion extending upwardly beyond the opposite surface of and fastened to said base portion, said base portion of each fastener having at least one edge being disposed in adjacent spaced relation to at least one complementary edge of the base portion of the next adjacent fastener, adjacent said fasteners being joined by two fracturable integral means that are laterally spaced a predetermined distance so that said strip is maintained as a rigid unit prior to fracture of said means, double faced adhesive foam type tape having a width less than said predetermined spaced relation and positioned between said fracturable means and extending over the entire cumulative length of said at least two fasteners and with one surface of said tape adhering to said one surface of said base portion, said tape being initially imperforate throughout the area covering said one surface and sealing said fastener receiving opening, said tabs extending through said foam tape and providing locating means, a non-adhering backing material covering the other face of said tape and being continuous throughout its length except for penetration by said tabs, whereby a slitting tool can be inserted between said fracturable means with said tape but not said backing material being transversely slit across its entire width at various axially spaced locations with one of said slits being disposed between each adjacent pair of said fasteners whereby an adjacent pair of fasteners can be separated by moving the adjacent bases into angular relation with respect to one another to break said fracturable means and then permit stripping of solely one of said fasteners from said non-adhering backing material to expose the second adhesive surface of said tape which is adapted for application in sealing relationship to a workpiece aperture which is located by said tabs to orient said fastener opening relative to said aperture in the workpiece.

2. A strip of the type claimed in claim 1 wherein said fasteners are generally rectangular in configuration and which present two edges that are substantially linear in configuration in spaced opposition.

3. A strip of the type claimed in claim 2 wherein said fracturable means is a pair of strips of metal extending integrally between each adjacent pairs of fasteners, score means on said strips adapted to permit fracture of said strips at a predetermined angular movement between adjacent fasteners.

4. A strip of the type claimed in claim 2 wherein said fasteners are disposed with said linear edges in opposed spaced relation between adjacent pairs of fasteners, said fracturable means are two short strips of scored integral metal that is fracturable upon bending to present said base portion of adjacent fasteners in predetermined angular relation, each of said fasteners having at least one wing portion serving as said grippable portion and extending angularly in a direction generally normal to said end edge carrying said fracturable means.

5. A strip of the type claimed in claim 4 wherein there are a pair of wings extending in opposite directions as defined by the edges of said strip.

6. A strip of the type claimed in claim 2 wherein said grippable portion includes a longitudinal rib the end of which interrupts said linear edge and projects above said plane to permit grasping.

7. A strip of the type claimed in claim 1 wherein said fastener receiving opening is defined by a screw impression.

8. A strip of the type claimed in claim 6 wherein said screw impression is a helically disposed embossment surrounding said opening.

9. A strip of the type claimed in claim 1 wherein said fastener receiving opening is defined by a bow-tie shaped opening adapted to accept a rotary fastener including a stud carrying locking arms which engage the fastener when rotated, the locking arms being acceptable by axial movement through the enlarged ends of said opening and engagable upon rotation with said fastener adjacent the restricted central portion of said opening.

10. A strip of the type claimed in claim 1 wherein said base portion and said wing portion are substantially greater in length than width.

11. A strip of the type claimed in claim 10 wherein said wing portions include two segments the first of which is generally perpendicular to an edge of said base portion and a second segment which angles outwardly and away therefrom.

12. The method of manufacturing strips of at least two metallic fasteners interconnected by fracturable means, applying foam type double face self adhering tape having a backing medium on the opposite side to said strip, including the steps of stamping a strip of metal to form a base portion having a fastener receiving opening therein, a pair of tabs dispersed in angular spaced relation adjacent said opening, and extending out of the plane of said base portion in a first direction, forming at least one wing portion extending out of the plane of said base portion in a direction opposite to said tabs, shearing the metal from between adjacent fasteners but leaving predetermined spaced connecting means extending between adjacent fasteners, scoring said connecting means to make said means fracturable, then applying continuous imperforate double face adhesive foam tape having a width less than said predetermined space to the tab side of said base portion with said tabs piercing both said tape and backing medium, shearing said tape but not said backing medium, separating a predetermined sequential number of fasteners from said strip of metal and the tape supply.

13. The method claimed in claim 12 wherein said method is carried out at a single location in a common machine.

14. The method claimed in claim 13 wherein said shearing of said tape includes backing-up said back-up medium and applying a controlled reciprocating knife-like member between said spaced fracturable means to slit said tape but not said backing medium.

15. The method claimed in claim 12 wherein said method of scoring said fracturable means is controlled to initially maintain said connected fasteners in a straight co-planar rigid relation but permissive of fracture by manual bending of one fastener relative to an adjacent fastener.

* * * * *